US012254821B2

(12) United States Patent
Hwang et al.

(10) Patent No.: US 12,254,821 B2
(45) Date of Patent: Mar. 18, 2025

(54) GATE DRIVING CIRCUIT AND MICRO-LED DISPLAY DEVICE INCLUDING THE SAME

(71) Applicant: LG DISPLAY CO., LTD., Seoul (KR)

(72) Inventors: Sujin Hwang, Paju-si (KR); Miyoung Son, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/405,527

(22) Filed: Jan. 5, 2024

(65) Prior Publication Data

US 2024/0257715 A1 Aug. 1, 2024

(30) Foreign Application Priority Data

Jan. 30, 2023 (KR) ........................ 10-2023-0012130

(51) Int. Cl.
*G09G 3/32* (2016.01)

(52) U.S. Cl.
CPC ....... *G09G 3/32* (2013.01); *G09G 2300/0408* (2013.01); *G09G 2310/0267* (2013.01)

(58) Field of Classification Search
CPC ............ H10K 59/00–95; H10K 59/12; H10K 59/131; H10K 59/88; G09G 3/3266; G09G 2300/0426; G09G 2330/08; G09G 2300/0408; G09G 3/3233; G09G 3/32; G09G 2310/0267; G09G 3/3225
See application file for complete search history.

(56) References Cited

U.S. PATENT DOCUMENTS

2019/0114961 A1* 4/2019 Chang ...................... G09G 3/20
2022/0093024 A1* 3/2022 Zheng .................... G09G 3/006

FOREIGN PATENT DOCUMENTS

KR 10-0685814 B1 2/2007

* cited by examiner

*Primary Examiner* — Sanjiv D. Patel
(74) *Attorney, Agent, or Firm* — Fish & Richardson P.C.

(57) ABSTRACT

In one aspect, a micro-LED display device includes a display panel with an array of a plurality of pixels, a first switch line, and a second switch line disposed in the display panel. Each of the plurality of pixels includes a micro-LED; a sub-pixel circuit configured to cause the micro-LED to emit light; and a Gate In Active (GIA) circuit configured to provide a scan signal to the sub-pixel circuit. The GIA circuit includes at least one gate driver configured to be enabled or disabled based on a first selection signal transmitted from the first switch line. The GIA circuit further includes at least one redundant gate driver configured to be enabled or disabled based on a second selection signal transmitted from the second switch line, wherein the redundant gate driver is enabled when the gate driver is disabled.

22 Claims, 11 Drawing Sheets

GATE DRIVING CIRCUIT AND MICRO-LED DISPLAY DEVICE INCLUDING THE SAME

CROSS-REFERENCE TO RELATED APPLICATIONS

This application claims priority from Korean Patent Application No. 10-2023-0012130 filed on Jan. 30, 2023 in the Korean Intellectual Property Office, and all the benefits accruing therefrom under 35 U.S.C. 119, the contents of which in its entirety are herein incorporated by reference.

BACKGROUND

Field of Disclosure

The present disclosure relates to a display device, and more specifically, to a gate driving circuit and a micro-LED display device including the same.

Background

Demand for display devices capable of displaying images and information in various forms is always increasing, as users desire easier means to access information. Various display devices are used for such purposes including liquid crystal display devices and organic light-emitting display devices.

This display device includes a data driving circuit that supplies data signals to the data lines of the display panel, and a gate driving circuit that sequentially supplies gate signals to the gate lines of the display panel.

Recently, micro-LED display devices that include micro-LEDs as light-emitting elements are being researched and developed. A micro-LED display device is in the spotlight as a next-generation display device because a micro-LED display device has the ability to display high quality images with high reliability.

SUMMARY

As a display device become thinner, technology to embed a gate driving circuit into a display panel is being developed. The gate driving circuit built into the display panel is known as a GIP (Gate In Panel) circuit and a GIA (Gate In Active) circuit.

In the micro-LED display device, the GIA circuit along with a pixel array is built into the display panel. Aspects of the present disclosure are directed to a device that provides a stable drive for at least one gate driver in the GIA circuit.

As will be described in detail below, a gate driving circuit is provided that is capable of driving at least one gate driver in a GIA circuit in a stable and reliable manner and a display device including the same.

In one aspect, a micro-LED display device includes a display panel with an array of a plurality of pixels, a first switch line, and a second switch line disposed in the display panel. Each of the plurality of pixels includes a micro-LED; a sub-pixel circuit configured to cause the micro-LED to emit light; and a Gate In Active (GIA) circuit configured to provide a scan signal to the sub-pixel circuit. The GIA circuit includes at least one gate driver configured to be enabled or disabled based on a first selection signal transmitted from the first switch line. The GIA circuit further includes at least one redundant gate driver configured to be enabled or disabled based on a second selection signal transmitted from the second switch line, wherein the redundant gate driver is enabled when the gate driver is disabled.

In another aspect, the first switch line is disposed on a first side of the array of the plurality of pixels, and the second switch line is disposed on a second side opposite to the first side of the array of the plurality of pixels.

In another aspect, the display panel includes a first GIA area, a second GIA area, and a third GIA area, wherein the first switch line and the second switch line are disposed in each of the first GIA area, the second GIA area, and the third GIA area.

In another aspect, the GIA circuit includes a first gate driver configured to provide a first scan signal to the sub-pixel circuit; and a second gate driver configured to provide a second scan signal to the sub-pixel circuit.

In another aspect, the first gate driver and the second gate driver are connected to the first switch line.

In another aspect, the first gate driver and the second gate driver are configured to be disabled in response to the first selection signal transmitted via the first switch line.

In another aspect, each of the first gate driver and the second gate driver includes a pull-up transistor configured to pull up an output end in response to a signal of a QB node; a pull-down transistor configured to pull down the output end according to a clock signal in response to the signal of a Q node; a first switch configured to transmit a high-potential voltage to the QB node in response to the first selection signal to turn off the pull-up transistor; and a second switch configured to transmit the high-potential voltage to the Q node in response to the first selection signal to turn off the pull-down transistor.

In another aspect, each of the first gate driver and the second gate driver is configured to one of charge or discharge the QB node and the Q node using at least one of a high-potential voltage VGH, a low-potential voltage VGL, a first voltage FWD, and a second voltage BWD in response to at least one of a global reset signal QRST, a reverse start signal VST_B, and a forward start signal VST_F.

In another aspect, the GIA circuit further includes a first redundant gate driver configured to provide the first scan signal to the sub-pixel circuit; and a second redundant gate driver configured to provide the second scan signal to the sub-pixel circuit.

In another aspect, the first redundant gate driver and the second redundant gate driver are connected to the second switch line.

In another aspect, each of the first redundant gate driver and the second redundant gate driver is configured to be disabled in response to the second selection signal transmitted via the second switch line.

In another aspect, each of the first redundant gate driver and the second redundant gate driver includes a pull-up transistor configured to pull up an output end in response to a signal of a QB node; a pull-down transistor configured to pull down the output end according to a clock signal in response to a signal of a Q node; a third switch configured to transmit a high-potential voltage to the QB node in response to the second selection signal to turn off the pull-up transistor; and a fourth switch configured to transmit the high-potential voltage to the Q node in response to the second selection signal to turn off the pull-down transistor.

In another aspect, each of the first redundant gate driver and the second redundant gate driver is configured to one of charge or discharge the QB node and the Q node using at least one of a high-potential voltage VGH, a low-potential voltage VGL, a first voltage FWD, and a second voltage BWD in response to at least one of a global reset signal QRST, thae reverse start signal VST_B, and a forward start signal VST_F.

In another aspect, the second selection signal is a signal obtained by inverting the first selection signal, and the first selection signal is a signal obtained by inverting the second selection signal.

In one aspect, a gate driving circuit includes a Gate In Active (GIA) circuit configured to provide a scan signal to a sub-pixel circuit of a display panel. The GIA circuit includes at least one gate driver connected to a first switch line disposed in the display panel and configured to be enabled or disabled based on a first selection signal transmitted from the first switch line; and at least one redundant gate driver connected to a second switch line disposed in the display panel and configured to be enabled or disabled based on a second selection signal transmitted from the second switch line, wherein the redundant gate driver is enabled when the gate driver is disabled.

In another aspect, the first switch line is disposed on one side of an array of a plurality of pixels included in the display panel, and the second switch line is disposed another side opposite to the one side of the array of the plurality of pixels.

In another aspect, the second selection signal is a signal obtained by inverting the first selection signal, and the first selection signal is a signal obtained by inverting the second selection signal.

In another aspect, the gate driver includes a pull-up transistor configured to pull up an output end in response to a signal of a QB node; a pull-down transistor configured to pull down the output end according to a clock signal in response to the signal of a Q node; a first switch configured to transmit a high-potential voltage to the QB node in response to the first selection signal to turn off the pull-up transistor; and a second switch configured to transmit the high-potential voltage to the Q node in response to the first selection signal to turn off the pull-down transistor.

In another aspect, each of the first gate driver and the second gate driver is configured to one of charge or discharge the QB node and the Q node using at least one of a high-potential voltage VGH, a low-potential voltage VGL, a first voltage FWD, and a second voltage BWD in response to at least one of a global reset signal QRST, a reverse start signal VST_B, and a forward start signal VST_F.

In another aspect, during a forward operation, the gate driver is configured to discharge the Q node to the first voltage in response to the forward start signal, and output the scan signal in response to the clock signal.

In another aspect, during a reverse operation, the gate driver is configured to charge the Q node to a second voltage in response to the reverse start signal, and output the scan signal in response to the clock signal.

In another aspect, the redundant gate driver includes a pull-up transistor configured to pull up an output end in response to a signal of a QB node; a pull-down transistor configured to pull down the output end according to a clock signal in response to a signal of a Q node; a third switch configured to transmit a high-potential voltage to the QB node in response to the second selection signal to turn off the pull-up transistor; and a fourth switch configured to transmit the high-potential voltage to the Q node in response to the second selection signal to turn off the pull-down transistor.

In another aspect, each of the first redundant gate driver and the second redundant gate driver is configured to one of charge or discharge the QB node and the Q node using at least one of a high-potential voltage VGH, a low-potential voltage VGL, a first voltage FWD, and a second voltage BWD in response to at least one of a global reset signal QRST, a reverse start signal VST_B, and a forward start signal VST_F.

In another aspect, during a forward operation, the redundant gate driver is configured to discharge the Q node to the first voltage in response to the forward start signal, and output the scan signal in response to the clock signal. During a reverse operation, the redundant gate driver is configured to charge the Q node to a second voltage in response to the reverse start signal, and output the scan signal in response to the clock signal.

DETAILED DESCRIPTION

Figure 1:
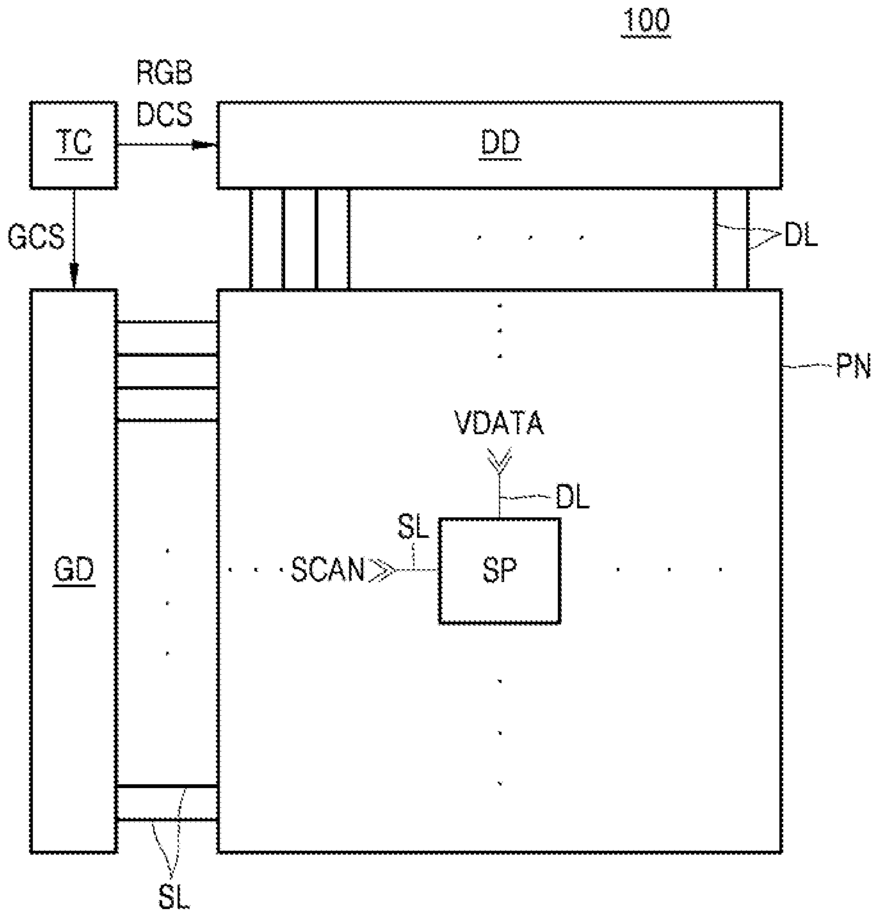
FIG. 1 shows a block diagram of a display device according to one aspect of the present disclosure.

Advantages and features of the present disclosure, and a method of achieving the advantages and features will become apparent with reference to embodiments described later in detail together with the accompanying drawings. However, the present disclosure is not limited to the embodiments as disclosed below, but may be embodied in various different forms. Thus, these embodiments are set forth only to make the present disclosure complete, and to completely inform the scope of the present disclosure to those of ordinary skill in the technical field to which the present disclosure belongs, and the present disclosure is only defined by the scope of the claims.

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the present disclosure, numerous specific details are set forth to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

A shape, a size, a ratio, an angle, a number, etc. disclosed in the drawings for illustrating embodiments of the present disclosure are illustrative, and the present disclosure is not limited thereto.

The terminology used herein is directed to the purpose of describing particular embodiments only and is not intended to be limiting of the present disclosure. As used herein, the singular constitutes "a" and "an" are intended to include the plural constitutes as well, unless the context clearly indicates otherwise. It will be further understood that the terms "comprise", "comprising", "include", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of associated listed items. Expression such as "at least one of" when preceding a list of elements may modify the entire list of elements and may not modify the individual elements of the list. In interpretation of numerical values, an error or tolerance therein may occur even when there is no explicit description thereof.

It will be understood that when an element or layer is referred to as "being connected by", or "connected to" another element or layer, it may be directly on, being connected by, or connected to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

In descriptions of temporal relationships, for example, temporal precedent relationships between two events such as "after", "subsequent to", "before", etc., another event may occur therebetween unless "directly after", "directly subsequent" or "directly before" is not indicated.

When a certain aspect may be embodied differently, a function or an operation specified in a specific block may occur in a different order from an order specified in a flowchart. For example, two blocks in succession may be actually performed substantially concurrently, or the two blocks may be performed in a reverse order depending on a function or operation involved.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The features of the various embodiments of the present disclosure may be partially or entirely combined with each other, and may be technically associated with each other or operate with each other. The embodiments may be embodied independently of each other and may be embodied together in an association relationship.

In interpreting a numerical value, the value is interpreted as including an error range unless there is no separate explicit description thereof.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, "embodiments," "examples," "aspects, and the like should not be construed such that any aspect or design as described is superior to or advantageous over other aspects or designs.

Further, the term 'or' means 'inclusive or' rather than 'exclusive or'. That is, unless otherwise stated or clear from the context, the expression that 'x uses a or b' means any one of natural inclusive permutations.

The terms used in the description below have been selected as being general and universal in the related technical field. However, there may be other terms than the terms depending on the development and/or change of technology, convention, preference of technicians, etc. Therefore, the terms used in the description below should not be understood as limiting technical ideas, but should be understood as examples of the terms for illustrating embodiments.

Further, in a specific case, a term may be arbitrarily selected by the applicant, and in this case, the detailed meaning thereof will be described in a corresponding description section. Therefore, the terms used in the description below should be understood based on not simply the name of the terms, but the meaning of the terms and the contents throughout the Detailed Descriptions.

In description of flow of a signal, for example, when a signal is delivered from a node A to a node B, this may include a case where the signal is transferred from the node A to the node B via another node unless a phrase 'immediately transferred' or 'directly transferred' is used.

Hereinafter, a gate driving circuit and a display device including the same according to some embodiments will be described.

FIG. 1 shows a block diagram of a display device 100 according to one aspect of the present disclosure.

Referring to FIG. 1, the display device 100 includes a display panel PN, a data driving circuit DD, a gate driving circuit GD, and a timing controller TC.

The display panel PN may include a plurality of subpixels circuit SP. The sub-pixel circuit SP may receive data voltage VDATA from the data driving circuit DD via a data line DL, and may receive a scan signal SCAN from the gate driving circuit GD via a scan line SL.

The data driving circuit DD may receive a video signal RGB and a data control signal DCS from the timing controller TC, and may convert the video signal RGB to a data voltage VDATA using a corresponding gray level voltage, and may output the data voltage VDATA to the data line DL of the display panel PN.

The gate driving circuit GD may receive a gate control signal GCS from the timing controller TC, and may generate the scan signal SCAN according to the gate control signal GCS, and may output the scan signal SCAN to the scan line SL of the display panel PN.

The timing controller TC may provide the video signals RGB and the data control signal DCS to the data driving circuit DD, and may provide the gate control signal GCS to the gate driving circuit GD.

Figure 2:
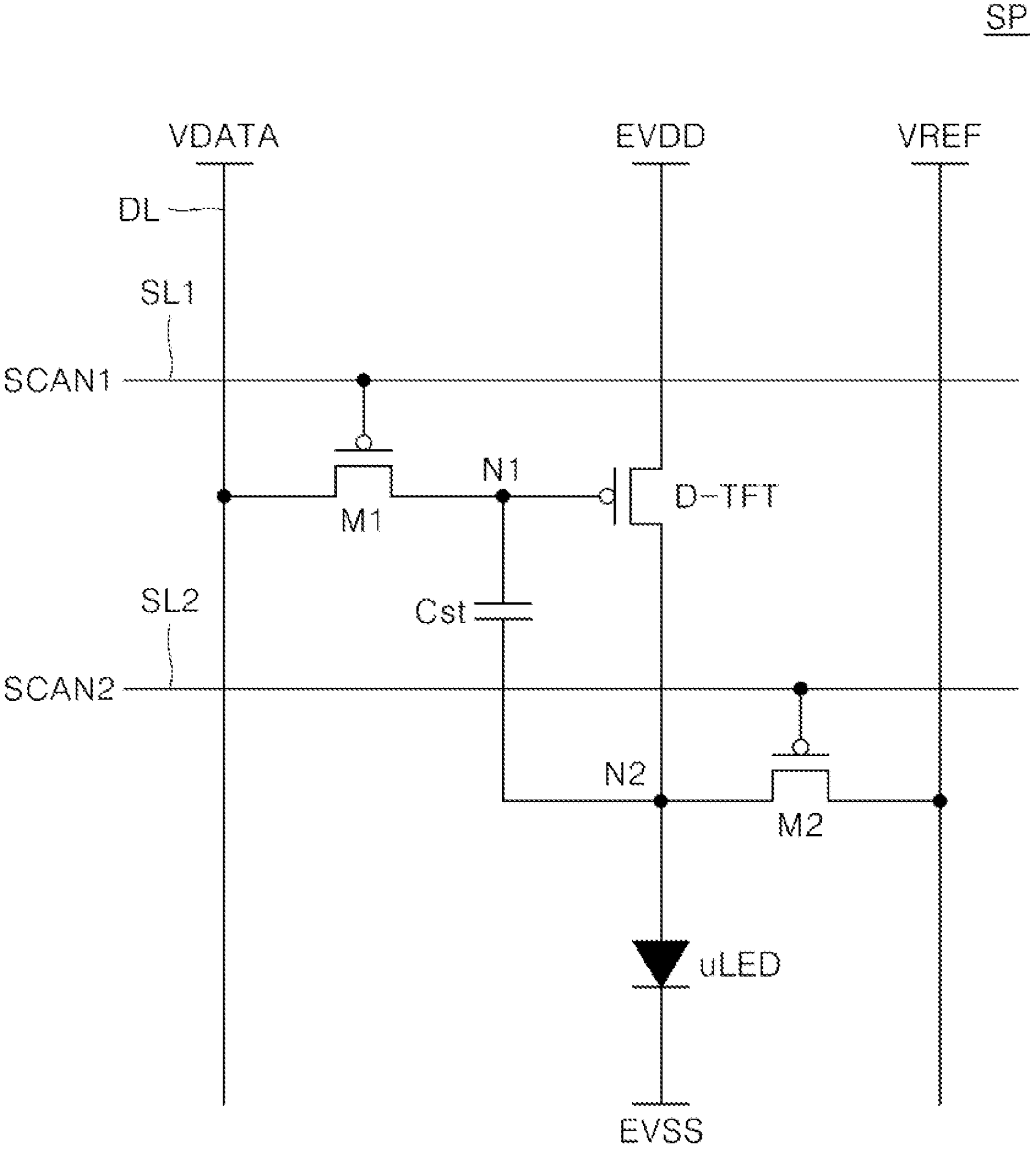
FIG. 2 shows a sub-pixel circuit of the display panel in FIG. 1 according to one aspect of the present disclosure.

FIG. 2 shows a sub-pixel circuit SP of the display panel PN in FIG. 1 according to one aspect of the present disclosure.

Referring to FIG. 2, the sub-pixel circuit SP includes a micro-LED uLED, a driving transistor D-TFT, a storage capacitor Cst, a first transistor M1, and a second transistor M2.

The micro-LED uLED emits light depending on a driving current. The micro-LED uLED includes an anode electrode and a cathode electrode, and a drain electrode of the driving transistor D-TFT may be coupled to the anode electrode. A low-potential light-emission voltage EVSS may be applied to the cathode electrode. The driving transistor D-TFT is coupled to and disposed between the micro-LED uLED and a high-potential light-emission voltage EVDD, and may control the driving current for light-emission of the micro-LED uLED according to the data voltage VDATA applied to the gate electrode. The driving transistor D-TFT includes a source electrode, a gate electrode, and a drain electrode. The gate electrode corresponds to a first node N1, and the drain electrode corresponds to a second node N2. The high-potential light-emission voltage EVDD is applied to the source electrode of the driving transistor D-TFT.

The storage capacitor Cst is connected to and disposed between the gate electrode and the drain electrode of the driving transistor D-TFT. The storage capacitor Cst may sample the data voltage VDATA when the first transistor M1 is turned on and may boost the gate electrode of the driving transistor.

The first transistor M1 is connected to and disposed between the data line DL and the gate electrode of the driving transistor D-TFT. Furthermore, the first transistor M1 is connected to and disposed between the data line DL and one electrode of the storage capacitor Cst. The data voltage VDATA is applied to the data line DL. The first transistor M1 transmits the data voltage VDATA to the first node N1 in response to a first scan signal SCAN1 applied through a first scan line SL1.

The second transistor M2 is connected to and disposed between a power line to which a reference voltage VREF is applied and the second node N2. The second transistor M2 may precharge the second node N2 to the reference voltage VREF in response to a second scan signal SCAN2 applied through a second scan line SL2.

According to one aspect, each of the driving transistor D-TFT, the first transistor M1, and the second transistor M2 may be embodied as a low temperature polycrystalline Oxide (LTPS) transistor or an oxide semiconductor transistor. However, the present disclosure is not limited thereto. For example, each of the driving transistor D-TFT, the first transistor M1, and the second transistor M2 may be embodied as a P-type oxide thin-film transistor or an N-type oxide thin-film transistor.

The sub-pixel circuit SP according to one aspect of the present disclosure is not limited thereto, and may include an additional transistor and an additional capacitor in addition to the micro-LED uLED, the driving transistor D-TFT, and the storage capacitor Cst. Furthermore, in the sub-pixel circuit SP, the driving transistor D-TFT may be connected to the cathode electrode of the micro-LED uLED, and the high-potential light-emission voltage EVDD may be connected to the anode electrode of the micro-LED uLED.

Figure 3:
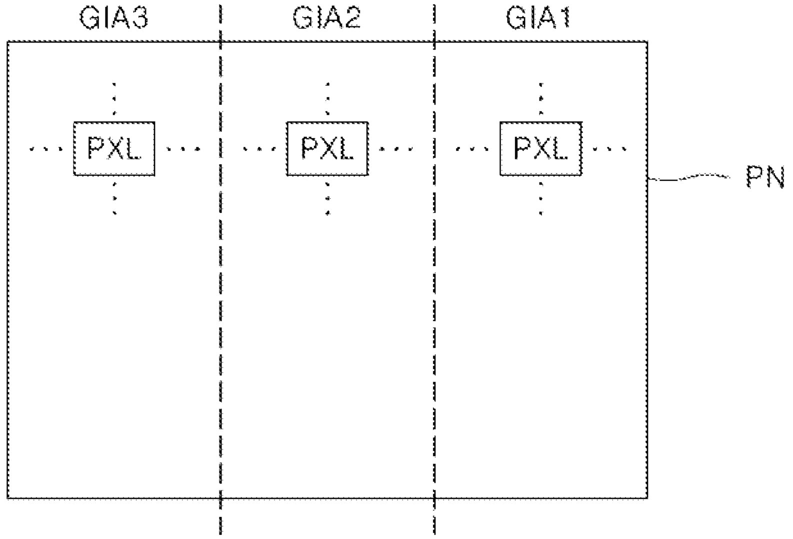
FIG. 3 shows a block diagram of a display panel of a display device according to one aspect of the present disclosure.

FIG. 3 shows a block diagram of a display panel PN of a display device according to one aspect of the present disclosure.

Referring to FIG. 3, the display panel PN may include a first area GIA1, a second area GIA2, and a third area GIA3. An array of a plurality of pixels PXL may be disposed in each of the first area GIA1, the second area GIA2, and the third area GIA3. A GIA circuit GIA (shown in FIG. 4) may be disposed at a center line of each of the first area GIA1, the second area GIA2, and the third area GIA3.

The pixel PXL may include the sub-pixel circuit SP shown in FIG. 2, and may include the GIA circuit that provides a scan signal to the scan line of the sub-pixel circuit SP. The GIA circuit may include a first gate driver S1 and a second gate driver S2.

Figure 4:
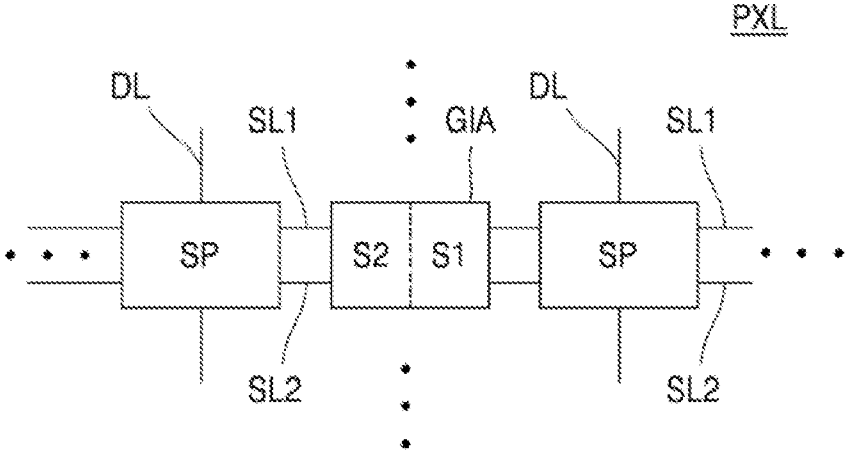
FIG. 4 shows a block diagram of a pixel array of the display panel in FIG. 3 according to one aspect of the present disclosure.

FIG. 4 shows a block diagram of the pixel PXL of the display panel PN in FIG. 3 according to one aspect of the present disclosure.

Referring to FIG. 2 to FIG. 4, the array of the plurality of pixels PXL may be disposed in each of the first area GIA1, the second area GIA2, and the third area GIA3. Each of the plurality of pixel PXL may include a sub-pixel circuit SP and a GIA circuit.

In one example, the GIA circuit may be disposed at the center line of each of the first area GIA1, the second area GIA2, and the third area GIA3. Two of a plurality of sub-pixel circuits SP may be respectively disposed on both opposing sides of the GIA circuit.

The sub-pixel circuit SP may be connected to the data driving circuit DD via the data line DL. The sub-pixel circuit SP may be connected to the GIA circuit via the first scan line SL1 and the second scan line SL2. The sub-pixel circuit SP may receive the data voltage VDATA from the data driving circuit DD, and may receive the first scan signal SCAN1 and the second scan signal SCAN2 from the GIA circuit.

The GIA circuit may include a first gate driver S1 and a second gate driver S2.

The first gate driver S1 may generate the first scan signal SCAN1, and may provide the first scan signal SCAN1 to the first transistor M1 of the sub-pixel circuit SP. The first transistor M1 may transmit the data voltage VDATA to the gate electrode of the driving transistor D-TFT and the storage capacitor Cst of the sub-pixel circuit SP in response to the first scan signal SCAN1.

The second gate driver S2 may generate the second scan signal SCAN2, and may provide the second scan signal SCAN2 to the second transistor M2 of the sub-pixel circuit SP. The second transistor M2 may transmit the reference voltage VREF to the second node N2 of the sub-pixel circuit SP in response to the second scan signal SCAN2.

The transistors to which the first scan signal SCAN1 and the second scan signal SCAN2 are provided are not limited to the first transistor M1 and the second transistor M2, and may vary depending on a configuration of the sub-pixel circuit SP.

Figure 5:
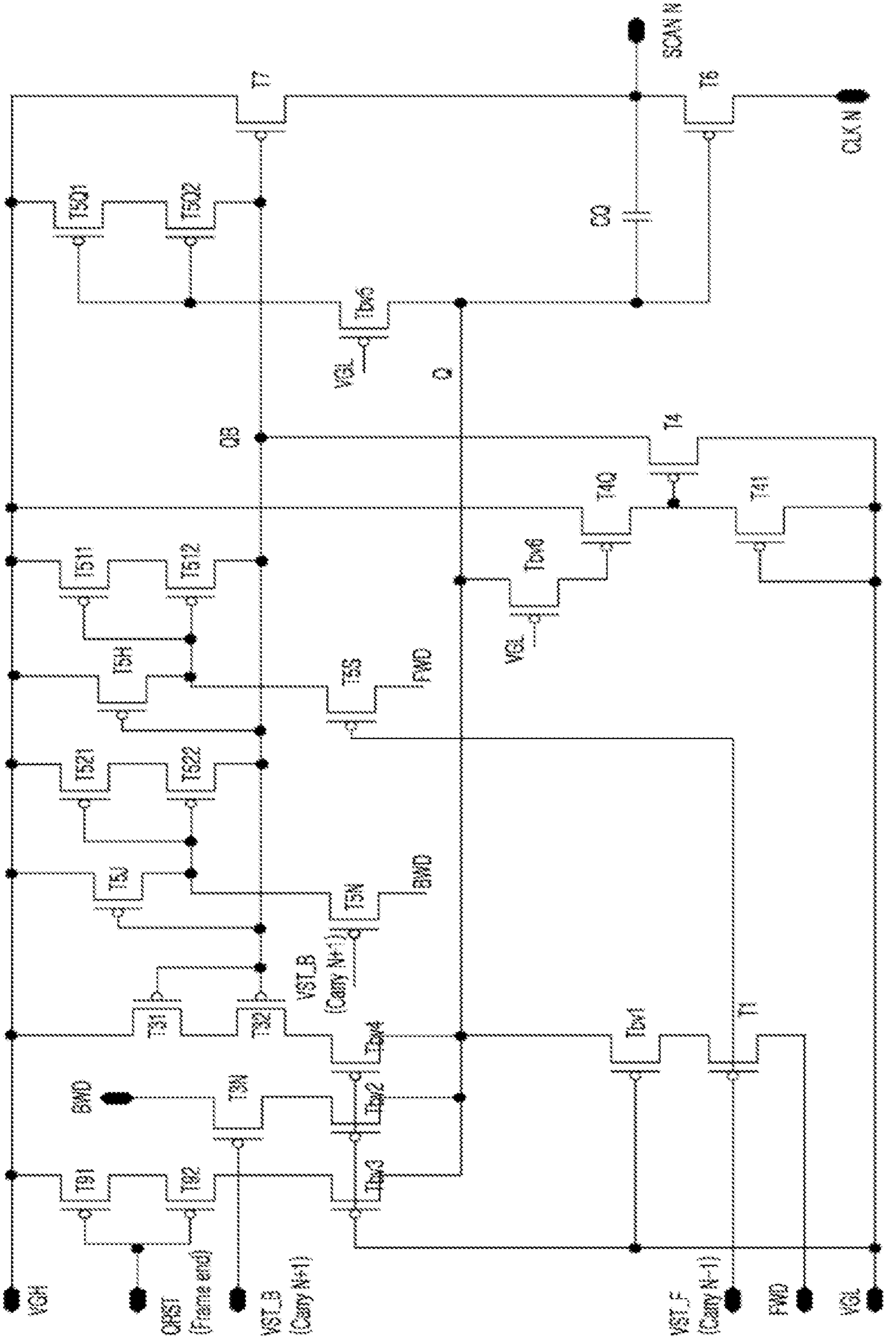
FIG. 5 shows a gate driver of a GIA (Gate In Active) circuit in FIG. 4 according to one aspect of the present disclosure.

FIG. 5 shows the gate driver of the GIA circuit in FIG. 4 according to one aspect of the present disclosure. The gate driver may include multiple stage circuits. Each of the plurality of stage circuits may be embodied as a circuit as shown in FIG. 5. The gate driver may be the first gate driver S1 or the second gate driver S2.

Referring to FIG. 5, the gate driver may include a pull-up transistor T7 and a pull-down transistor T6.

The pull-up transistor T7 may have a source electrode to which a high-potential voltage VGH is applied, a drain electrode to which an output end may be connected, and a gate electrode to which a QB node may be connected. The pull-up transistor T7 may pull-up an output end in response to a signal of the QB node.

A clock signal CLKN may be applied to a drain electrode of the pull-down transistor T6. The output end may be connected to a source electrode of the pull-down transistor T6, and a Q node may be connected to a gate electrode of the pull-down transistor T6. The pull-down transistor T6 may pull-down the output end according to the clock signal CLKN in response to a signal of the Q node.

The gate driver may further include a transistor T91, a transistor T92, and a transistor Tbv3. The transistor T91 and the transistor T92 may transmit the high-potential voltage VGH to the transistor Tbv3 in response to a global reset signal QRST. In this regard, the global reset signal QRST may be applied at each frame end of the video. In one example, the gate driver may initialize the Q node to the high-potential voltage VGH in response to the global reset signal QRST applied at each frame end of the video. The transistor Tbv3 may deliver the high-potential voltage VGH to the Q node in response to low-potential voltage VGL.

Furthermore, the gate driver may further include a transistor T1 and a transistor Tbv1. In a first stage circuit among the plurality of stage circuits, the transistor T1 may transmit a first voltage FWD to the transistor Tbv1 in response to a forward start signal VST_F.

The transistor Tbv1 may deliver the first voltage FWD to the Q node in response to the low-potential voltage VGL. In this regard, the first voltage FWD may be set to have a level of the low-potential voltage VGL.

The transistor T1 and the transistor Tbv1 may discharge the Q node to the first voltage FWD during forward operation. In this regard, as the Q node is discharged, the pull-down transistor T6 may pull-down the output end in response to the clock signal CLKN. In this regard, the forward operation may be defined as sequential operation from the first stage circuit to a last stage circuit among the plurality of stage circuits.

In this regard, in each of a second stage circuit to the last stage circuit among the plurality of stage circuits, the transistor T1 may deliver the first voltage FWD to the transistor Tbv1 in response to a carry signal Carry N−1. In this regard, the carry signal Carry N−1 may be a signal output from a previous stage circuit.

Furthermore, the gate driver may further include a transistor T3N and a transistor Tbv2. In the first stage circuit among the plurality of stage circuits, the transistor T3N may transmit a second voltage BWD to the transistor Tbv2 in response to a reverse start signal VST_B.

The transistor Tbv2 may deliver the second voltage BWD to the Q node in response to the low-potential voltage VGL. In this regard, the second voltage BWD may be set to have a level of the high-potential voltage VGH.

The transistor T3N and transistor Tbv2 may charge the Q node to the second voltage BWD during a reverse operation. In this regard, as the Q node is charged, the pull-down transistor T6 may pull-down the output end in response to the clock signal CLKN. In this regard, reverse operation may be defined as sequential operation from the last stage circuit to the first stage circuit among the plurality of stage circuits.

In this regard, in each of the second stage circuit to the last stage circuit among the plurality of stage circuits, the transistor T3N may deliver the second voltage BWD to the transistor Tbv2 in response to a carry signal Carry N+1. In this regard, the carry signal Carry N+1 may be a signal output from a next stage circuit.

Furthermore, the gate driver may further include transistors T31 and T32 and a transistor Tbv4. The transistors T31 and T32 may transmit the high-potential voltage VGH to the transistor Tbv4 in response to the signal of the QB node. The transistor Tbv4 may deliver the high-potential voltage VGH to the Q node in response to the low-potential voltage VGL.

While the pull-up transistor T7 is turned on due to the discharge of the QB node, the transistors T31 and T32 and the transistor Tbv4 may transmit the high-potential voltage VGH to the Q node, thereby turning off the pull-down transistor T6.

Furthermore, the gate driver may further include transistors T4 and T41, a transistor T4Q, and a transistor Tbv6. When the Q node has been charged, the transistors T4 and T41 may transmit the low-potential voltage VGL to the QB node in response to the low-potential voltage VGL, thereby turning on the pull-up transistor T7.

When the Q node is discharged such that the pull-down transistor T6 is driven, the transistor T4Q and the transistor Tbv6 may transmit the high-potential voltage VGH to the transistors T4 and T41 to turn off the transistors T4 and T41.

While the pull-down transistor T6 is turned on according to the clock signal CLKN due to the discharge of the Q node, the transistors T4 and T41, the transistor T4Q, and the transistor Tbv6 may prevent the QB node from being discharged, thereby turning off the transistor T7.

Furthermore, the gate driver may further include a transistor T5S, transistors T511 and T512, and a transistor T5H. During the forward operation, the transistor T5S may transmit the first voltage FWD to the transistors T511 and T512 in response to the forward start signal VST_F or the carry signal Carry N−1.

The transistors T511 and T512 may deliver the high-potential voltage VGH to the QB node in response to the first voltage FWD. The transistor T5H may turn off the transistors T511 and T512 in response to the signal of the QB node.

The transistor T5S, the transistors T511 and T512, and the transistor T5H may control the signal of the QB node during the forward operation.

Furthermore, the gate driver may further include a transistor T5N, transistors T521, T522, and a transistor T5J. During the reverse operation, the transistor T5N may transmit the second voltage BWD to the transistors T521 and T522 in response to the reverse start signal VST_B or the carry signal Carry N+1.

The transistors T521 and T522 may deliver the high-potential voltage VGH to the QB node in response to the second voltage BWD. The transistor T5J may turn off the transistors T521 and T522 in response to the signal of the QB node.

The transistor T5N, the transistors T521 and T522, and the transistor T5J may control the signal of the QB node during the reverse operation.

Furthermore, the gate driver may further include a transistor Tbv5 and transistors T5Q1 and T5Q2. The transistor Tbv5 may transmit the signal of the Q node to the transistors T5Q1 and T5Q2 in response to the low-potential voltage VGL. The transistors T5Q1 and T5Q2 may deliver the high-potential voltage VGH to the QB node in response to the signal of the Q node.

While the pull-down transistor T6 provides a voltage to the output end according to the clock signal CLKN as the Q node is discharged, the transistor Tbv5 and the transistors T5Q1 and T5Q2 may transmit the high-potential voltage VGH to the QB node such that the pull-up transistor T7 may be prevented from being turned on.

Furthermore, the gate driver may further include a stabilization capacitor CQ. The stabilization capacitor CQ may be connected to and disposed between the output end and the Q node to stabilize a voltage level of the output end when outputting the scan signal.

Figure 6:
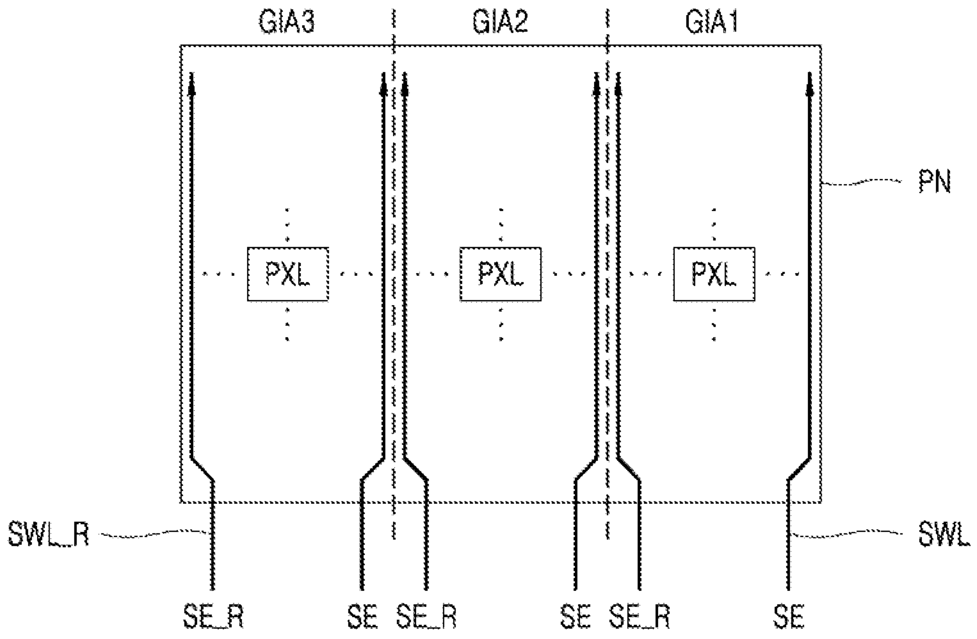
FIG. 6 shows a block diagram of a display panel of a display device according to one aspect of the present disclosure.

FIG. 6 shows a block diagram of a display panel PN of a display device according to one aspect of the present disclosure.

Referring to FIG. 6 and FIG. 3, the display panel PN may include the first area GIA1, the second area GIA2, and the third area GIA3. An array of a plurality of pixels PXL may be disposed in each of the first area GIA1, the second area GIA2, and the third area GIA3. A GIA circuit GIA (shown in FIG. 7) may be disposed at a center line of each of the first area GIA1, the second area GIA2, and the third area GIA3.

The pixel PXL may include the sub-pixel circuit SP as shown in FIG. 2, and may include the GIA circuit that provides the scan signal to the scan line of the sub-pixel circuit SP. The GIA circuit may include the first gate driver S1, the second gate driver S2, a first redundant gate driver S1_R, and a second redundant gate driver S2_R (see FIG. 7).

Furthermore, the display panel PN may include a first switch line SWL and a second switch line SWL_R.

The first switch line SWL and the second switch line SWL_R may be disposed in each of the first area GIA1, the second area GIA2, and the third area GIA3. In one example, the first switch line SWL and the second switch line SWL_R may be respectively disposed on both opposing sides of the pixel PXL. However, the present disclosure is not limited thereto. In another example, the first switch line SWL and the second switch line SWL_R may be disposed along a center line of each of the first area GIA1, the second area GIA2, and the third area GIA3.

The first switch line SWL and the second switch line SWL_R may be electrically connected to the pixel PXL. The first switch line SWL may provide a first selection signal SE to the first gate driver S1 and the second gate driver S2 of the GIA circuit of the pixel PXL. The second switch line SWL_R may provide a second selection signal SE_R to the first redundant gate driver S1_R and the second redundant gate driver S2_R of the GIA circuit of the pixel PXL.

In this regard, the first selection signal SE may be a signal used to enable or disable the first gate driver S1 and the second gate driver S2, while the second selection signal SE_R may be a signal used to enable or disable the first redundant gate driver S1_R and the second redundant gate driver S2_R.

Figure 7:
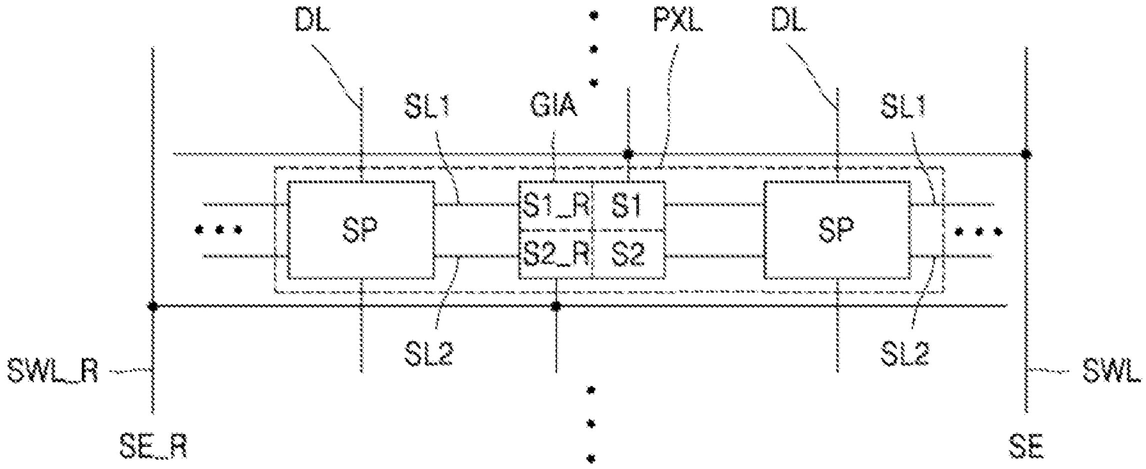
FIG. 7 shows a block diagram of a pixel array of the display panel in FIG. 6 according to one aspect of the present disclosure.

FIG. 7 shows a block diagram of the pixel PXL of the display panel PN in FIG. 6 according to one aspect of the present disclosure.

Referring to FIG. 2, FIG. 6, and FIG. 7, the array of the plurality of pixels PXL may be disposed in each of the first area GIA1, the second area GIA2, and the third area GIA3. Each pixel of the array of the plurality of pixels PXL may include the sub-pixel circuit SP and the GIA circuit.

The first switch line SWL and the second switch line SWL_R may be respectively disposed on both opposing sides of the pixel PXL. Alternatively, the first switch line SWL and the second switch line SWL_R may be disposed along a line where the GIA circuit is disposed.

The GIA circuit may be disposed at a center line of each of the first area GIA1, the second area GIA2, and the third area GIA3. Two of the plurality of sub-pixel circuits SP may be respectively disposed on both opposing sides of the GIA circuit.

The sub-pixel circuit SP may be connected to the GIA circuit via the first scan line SL1 and the second scan line SL2. The sub-pixel circuit SP may receive the first scan signal SCAN1 and the second scan signal SCAN2 from the GIA circuit.

The GIA circuit may include the first gate driver S1, the second gate driver S2, the first redundant gate driver S1_R, and the second redundant gate driver S2_R.

The first gate driver S1 and the second gate driver S2 may be connected to the first switch line SWL, while the first redundant gate driver S1_R and the second redundant gate driver S2_R may be connected to the second switch line SWL_R.

The first gate driver S1 may generate the first scan signal SCAN1 and provide the generated first scan signal SCAN1 to the first transistor M1 of the sub-pixel circuit SP. The second gate driver S2 may generate the second scan signal SCAN2 and provide the generated second scan signal SCAN2 to the second transistor M2 of the sub-pixel circuit SP.

The first redundant gate driver S1_R and the second redundant gate driver S2_R may be enabled in response to the second selection signal SE_R when the first gate driver S1 and the second gate driver S2 fail. In this regard, the first gate driver S1 and the second gate driver S2 may be disabled in response to the first selection signal SE.

When the first redundant gate driver S1_R and the second redundant gate driver S2_R are enabled, the first redundant gate driver S1_R and the second redundant gate driver S2_R may generate the first scan signal SCAN1 and the second scan signal SCAN2, respectively, in place of the first gate driver S1 and the second gate driver S2, and may provide the first scan signal SCAN1 and the second scan signal SCAN2 to the first transistor M1 and the second transistor M2 of the sub-pixel circuit SP, respectively.

Figure 8:
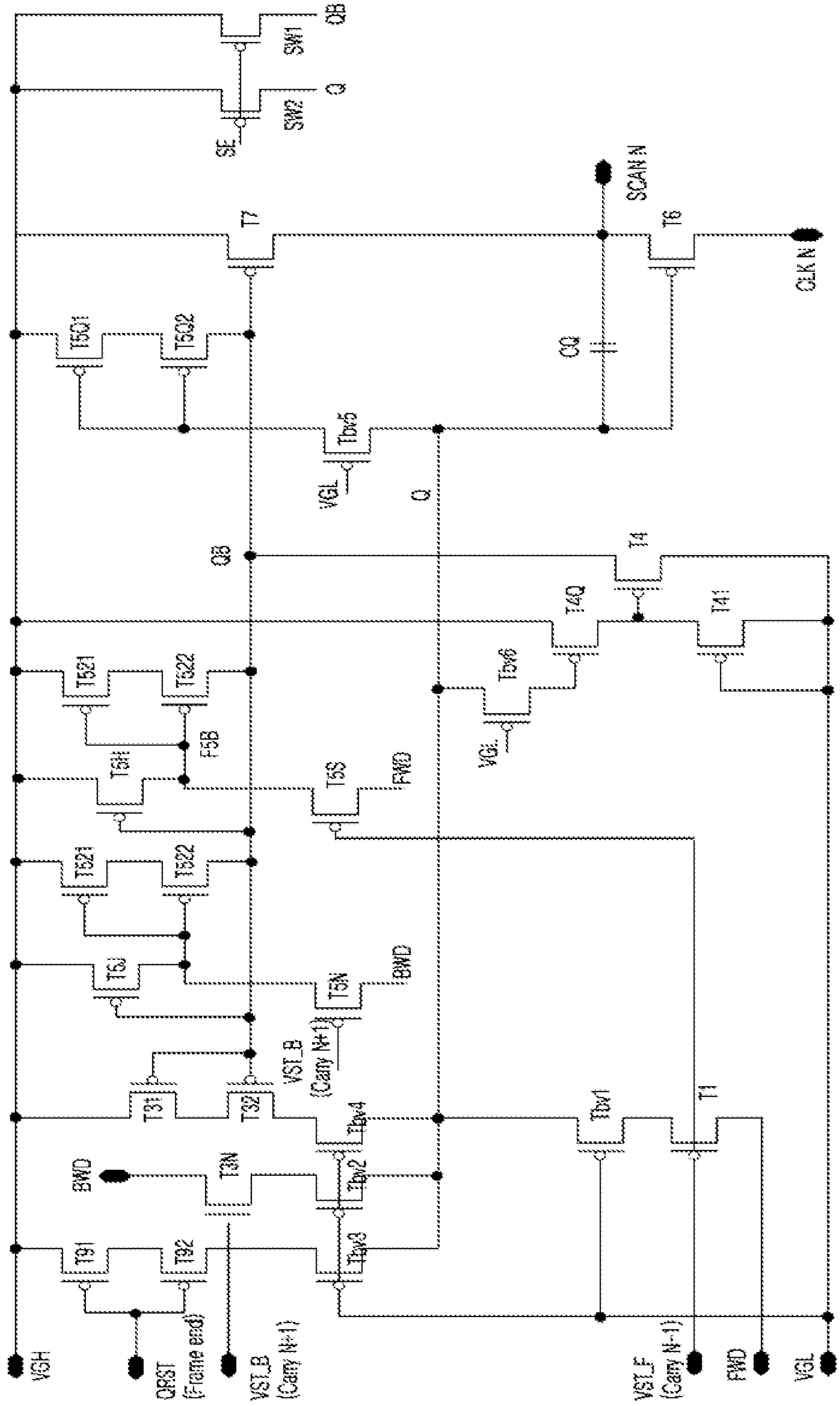
FIG. 8 shows a gate driver of a GIA circuit in FIG. 7 according to one aspect of the present disclosure.

FIG. 8 shows the gate driver of the GIA circuit in FIG. 7 according to one aspect of the present disclosure. The gate driver may be the first gate driver S1 or the second gate driver S2.

Referring to FIG. 8, the gate driver of the GIA circuit may further include a first switch SW1 and a second switch SW2, compared to the gate driver as shown in FIG. 5.

The first switch SW1 and the second switch SW2 may be connected to the first switch line SWL. The first switch SW1 and the second switch SW2 may control the signals of the QB node and Q node in response to the first selection signal SE to enable or disable the gate driver.

In one example, when the first selection signal SE of a high logic level is applied, the first switch SW1 and the second switch SW2 may be turned off to enable the gate driver. When the first selection signal SE of a low logic level is applied, the first switch SW1 and the second switch SW2 may be turned on to deliver the high-potential voltage VGH to the QB node and the Q node to disable the gate driver.

Figure 9:
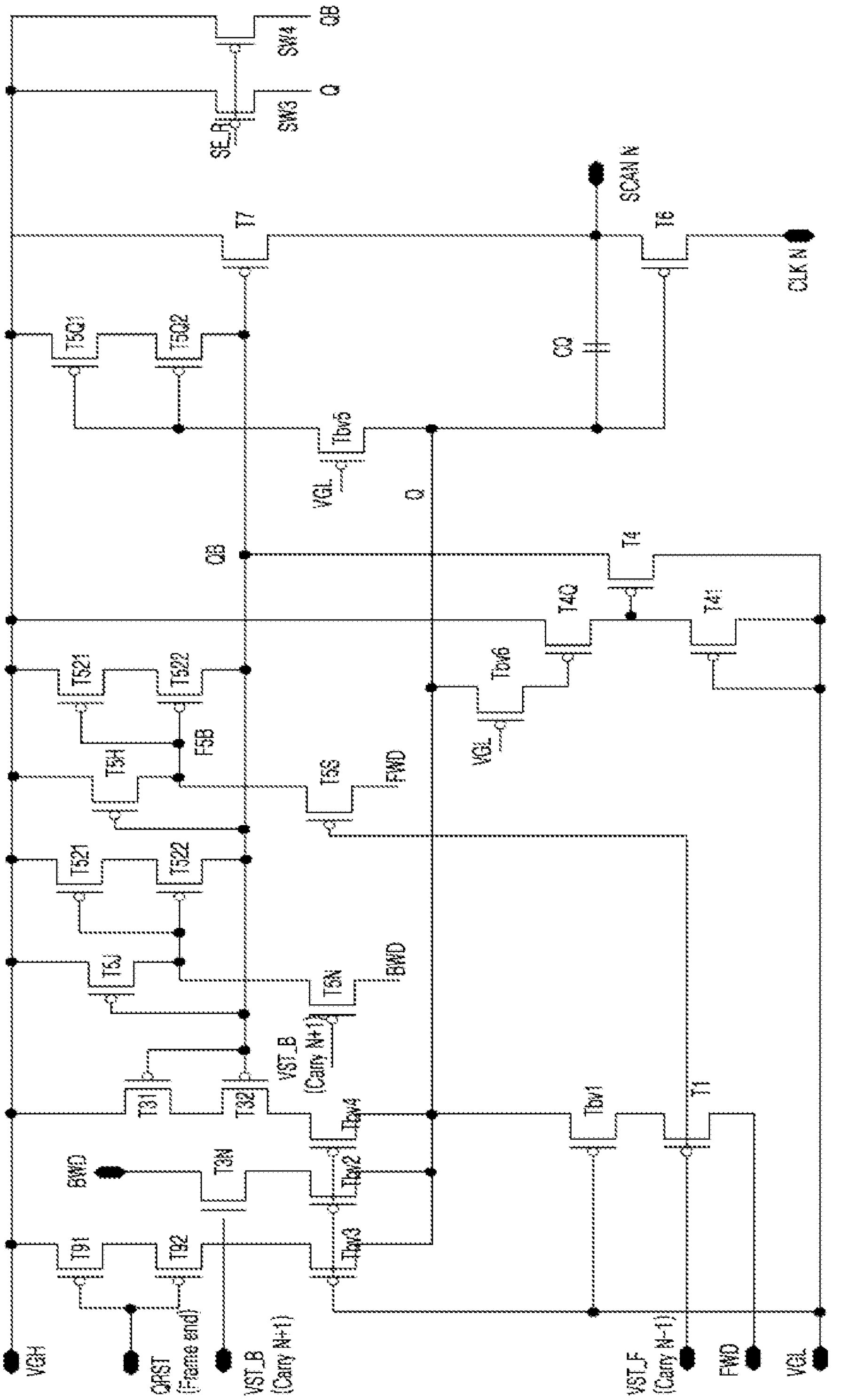
FIG. 9 shows a redundant gate driver of the GIA circuit in FIG. 7 according to one aspect of the present disclosure.

FIG. 9 shows a redundant gate driver of the GIA circuit in FIG. 7 according to one aspect of the present disclosure. The redundant gate driver may be the first redundant gate driver S1_R and the second redundant gate driver S2_R.

Referring to FIG. 9, the redundant gate driver of the GIA circuit may further include a third switch SW3 and a fourth switch SW4 compared to the gate driver as shown in FIG. 5.

The third switch SW3 and fourth switch SW4 may be connected to the second switch line SWL_R. The third switch SW3 and the fourth switch SW4 may control the signals of the QB node and the Q node in response to the second selection signal SE_R to enable or disable the redundant gate driver.

In one example, when the second selection signal SE_R of a low logic level is applied, the third switch SW3 and the fourth switch SW4 may be turned on to deliver the high-potential voltage VGH to the QB node and the Q node to disable the redundant gate driver. When the second selection signal SE_R of a high logic level is applied, the third switch SW3 and the fourth switch SW4 may be turned off to enable the redundant gate driver.

The second selection signal SE_R may be set as an inverted signal obtained by inverting the first selection signal SE. When the gate driver of the GIA circuit fails, the gate driver may be disabled by applying the first selection signal SE of the low logic level, while the redundant gate driver may be enabled by applying the second selection signal SE_R of the high logic level.

A switch circuit that applies the first selection signal SE or the second selection signal SE_R may be included outside the display panel PN. In one example, the switch circuit may be mounted on a printed circuit board on which the data driving circuit DD is mounted. Alternatively, the switch circuit may be mounted on a separate printed circuit board. Alternatively, the switch circuit may be mounted in a non-display area of the display panel.

In one example, the switch circuit may include a level shifter. The level shifter may shift a level of each of the first selection signal SE and the second selection signal SE_R to turn on or off each of the first switch SW1, the second switch SW2, the third switch SW3, and the fourth switch SW4.

Figure 10:
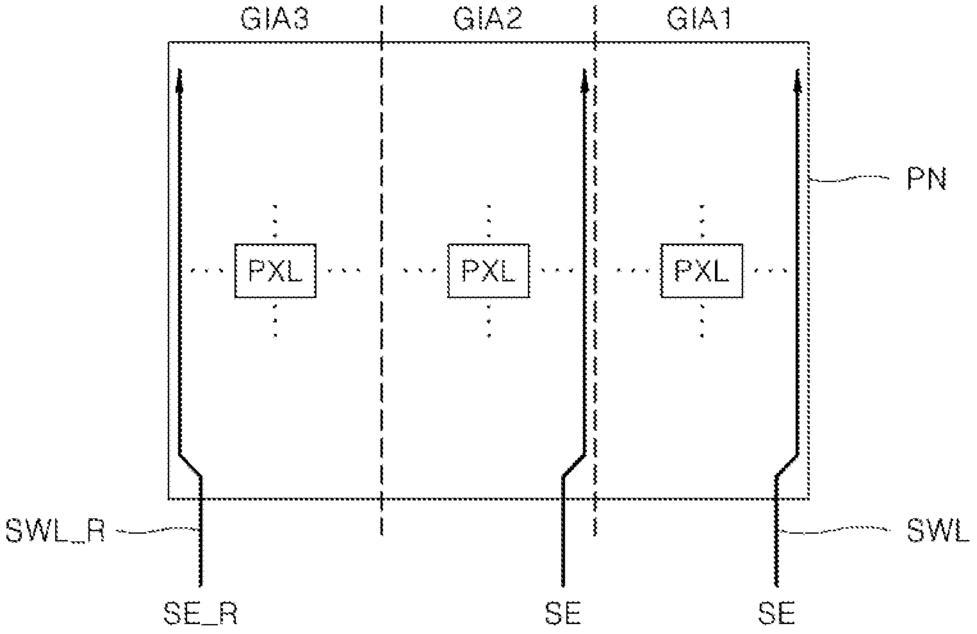
FIG. 10 is a block diagram showing an operation when a gate driver failure occurs in a third GIA area of FIG. 6 according to one aspect of the present disclosure.

FIG. 10 is a block diagram showing an operation when a gate driver failure occurs in the third GIA area of FIG. 6 according to one aspect of the present disclosure.

Referring to FIG. 10, for example, when a gate driver failure occurs in the third area GIA3 among the first area GIA1, the second area GIA2, and the third area GIA3, the switch circuit may apply the second selection signal SE_R of the high logic level to enable the redundant gate driver in the third area GIA3.

At this time, the switch circuit may apply the first selection signal SE of the low logic level to disable the gate driver in the third area GIA3.

Figure 11:
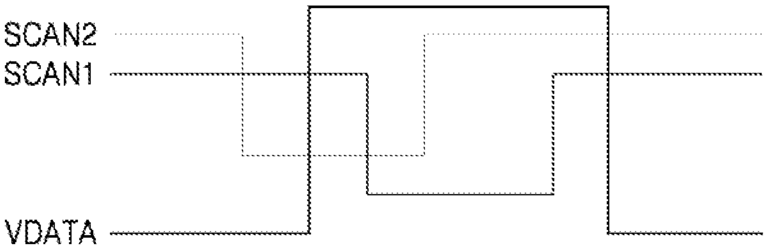
FIG. 11 shows a timing of a sub-pixel circuit according to one aspect of the present disclosure.

FIG. 11 shows a timing of the sub-pixel circuit SP of the display device 100 according to one aspect of the present disclosure.

Referring to FIG. 2 and FIG. 11, first, the sub-pixel circuit SP receives the second scan signal SCAN2 from the second gate driver S2. In this regard, the second transistor M2 of the sub-pixel circuit SP transmits the reference voltage VREF to the second node N2 in response to the second scan signal SCAN2.

Next, the sub-pixel circuit SP receives the data voltage VDATA from the data driving circuit DD.

Next, the sub-pixel circuit SP receives the first scan signal SCAN1 from the first gate driver S1. In this regard, the first transistor M1 of the sub-pixel circuit SP transmits the data voltage VDATA to the first node N1 in response to the first scan signal SCAN1. The storage capacitor Cst of the sub-pixel circuit SP samples the data voltage VDATA, and the driving transistor D-TFT provides the driving current according to the voltage of the first node N1 to the micro-LED uLED such that the micro-LED uLED emits light.

In one example, a pulse width of the second scan signal SCAN2 may be set to be smaller than a pulse width of the first scan signal SCAN1. A pulse width of the data voltage VDATA may be set to be larger than the pulse width of the first scan signal SCAN1.

Figure 12:
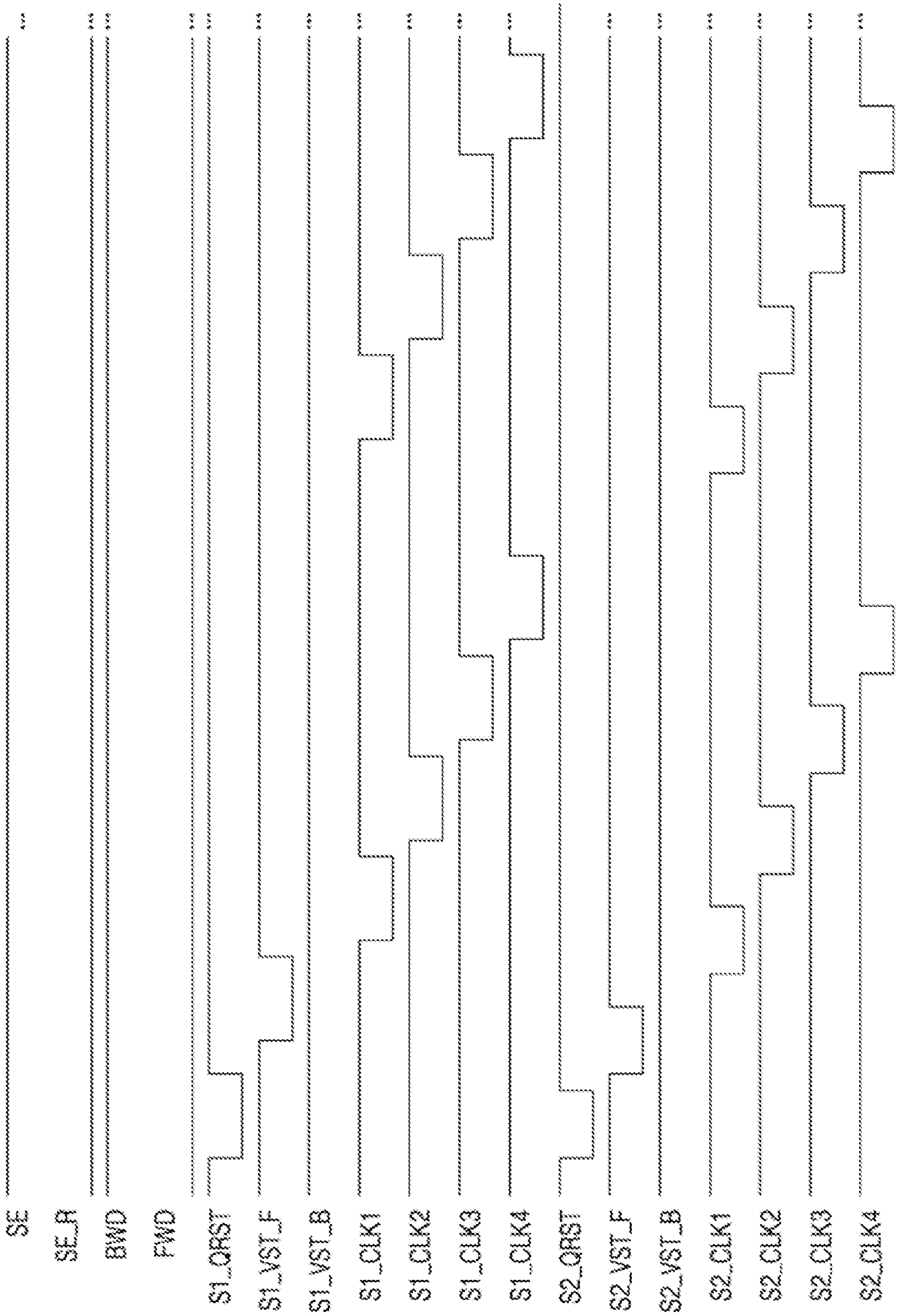
FIG. 12 and FIG. 13 show a timing of the gate driver according to one aspect of the present disclosure.
Figure 13:
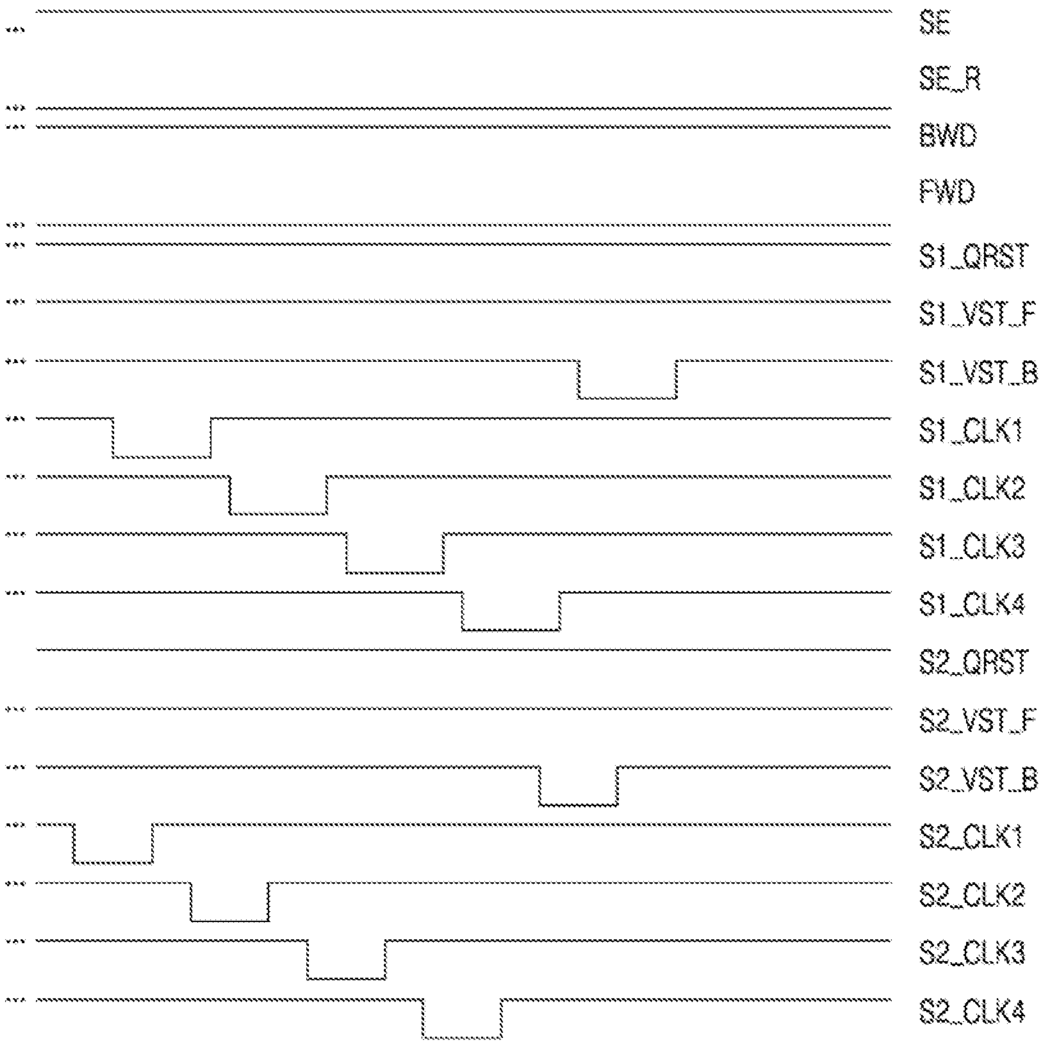

FIG. 12 and FIG. 13 show a timing of the gate driver according to some aspects of the present disclosure. In one example, FIG. 12 and FIG. 13 are timing diagrams during the forward operation of the gate driver.

Referring to FIG. 12 and FIG. 13, the first gate driver S1 and the second gate driver S2 may be enabled in response to the first selection signal SE of a high logic level. In this regard, the first redundant gate driver S1_R and the second redundant gate driver S2_R may be disabled in response to the second selection signal SE_R of a low logic level.

During the forward operation, the first voltage BWD may be set to the high-potential voltage VGH level, while the second voltage FWD may be set to the low-potential voltage VGL level.

The first gate driver S1 may initialize the QB node to the low-potential voltage VGL level and may initialize the Q node to the high-potential voltage VGH level in response to the global reset signal S1_QRST.

Next, the first gate driver S1 may charge the QB node to the first voltage BWD and discharge the Q node to the second voltage FWD in response to the forward start signal S1_VST_F, and thus start an operation. The first gate driver S1 may sequentially output the first scan signal SCAN1 to each of the first scan lines SL1 of the display panel PN in response to clock signals S1_CLK1, S1_CLK2, S1_CLK3, and S1_CLK4.

Next, the first gate driver S1 may discharge the QB node to the second voltage FWD and charge the Q node to the first voltage BWD in response to the reverse start signal S1_VST_B, and thus terminate the operation.

Furthermore, the second gate driver S2 may initialize the QB node to the low-potential voltage VGL level, and may initialize the Q node to the high-potential voltage VGH level in response to the global reset signal S2_QRST.

Next, the second gate driver S2 may charge the QB node to the first voltage BWD and discharge the Q node to the second voltage FWD in response to the forward start signal S2_VST_F, and thus start an operation. The second gate driver S2 may sequentially output the second scan signal SCAN2 to each of the second scan lines SL2 of the display panel PN in response to clock signals S2_CLK1, S2_CLK2, S2_CLK3, and S2_CLK4.

Next, the second gate driver S2 may discharge the QB node to the second voltage FWD and charge the Q node to the first voltage BWD in response to the reverse start signal S2_VST_B, and thus terminate the operation.

Figure 14:
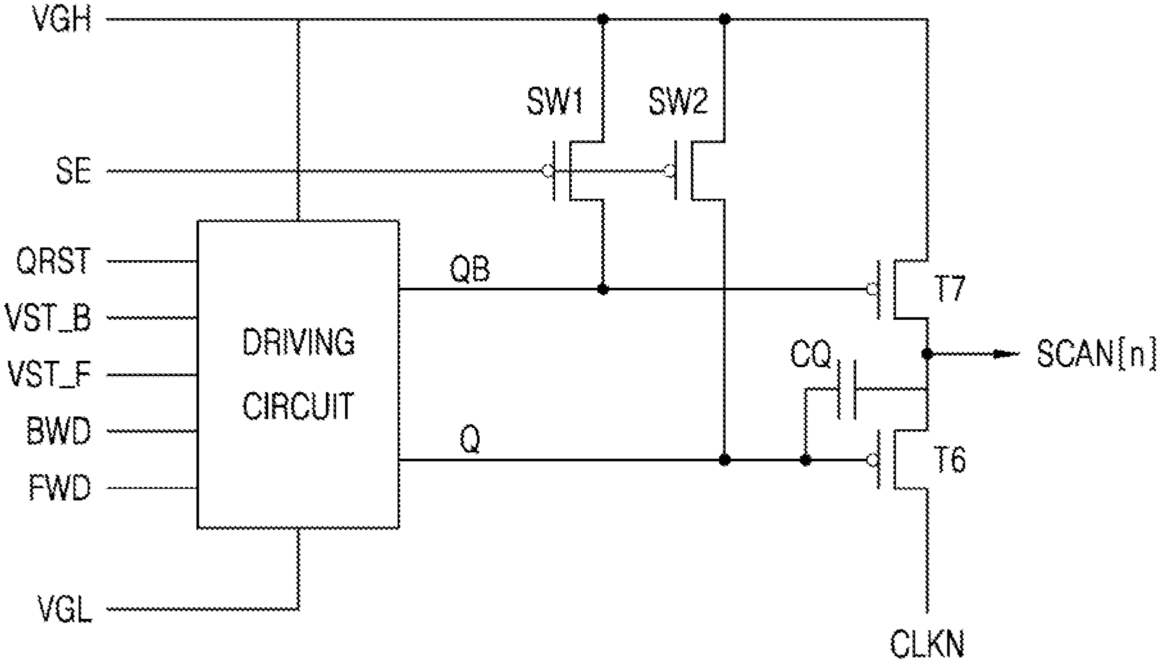
FIG. 14 shows a gate driver according to one aspect of the present disclosure.

FIG. 14 shows a gate driver according to one aspect of the present disclosure. The gate driver may be the first gate driver S1 or the second gate driver S2 which generates the first scan signal or the second scan signal, respectively.

Referring to FIG. 14, the gate driver may include a driving circuit DRIVING CIRCUIT, the first switch SW1, the second switch SW2, the pull-up transistor T7, and the pull-down transistor T6.

The first switch SW1 and the second switch SW2 may be turned off based on the first selection signal SE or may transmit the high-potential voltage VGH to the QB node and the Q node to enable or disable the gate driver.

The driving circuit may charge or discharge the QB node and Q node using at least one of the high-potential voltage VGH, the low-potential voltage VGL, the first voltage FWD, and the second voltage BWD in response to at least one of the global reset signal QRST, the reverse start signal VST_B, and the forward start signal VST_F.

The high-potential voltage VGH may be applied to the source electrode of the pull-up transistor T7. The output end may be connected to the drain electrode of the pull-up transistor T7. The QB node may be connected to the gate electrode of the pull-up transistor T7. The pull-up transistor T7 may pull-up the output end in response to the signal of the QB node.

The clock signal CLKN may be applied to the drain electrode of the pull-down transistor T6. The output end may be connected to the source electrode of the pull-down transistor T6, and the Q node may be connected to the gate electrode of the pull-down transistor T6. The pull-down transistor T6 may pull-down the output end according to the clock signal CLKN in response to the signal of the Q node.

Figure 15:
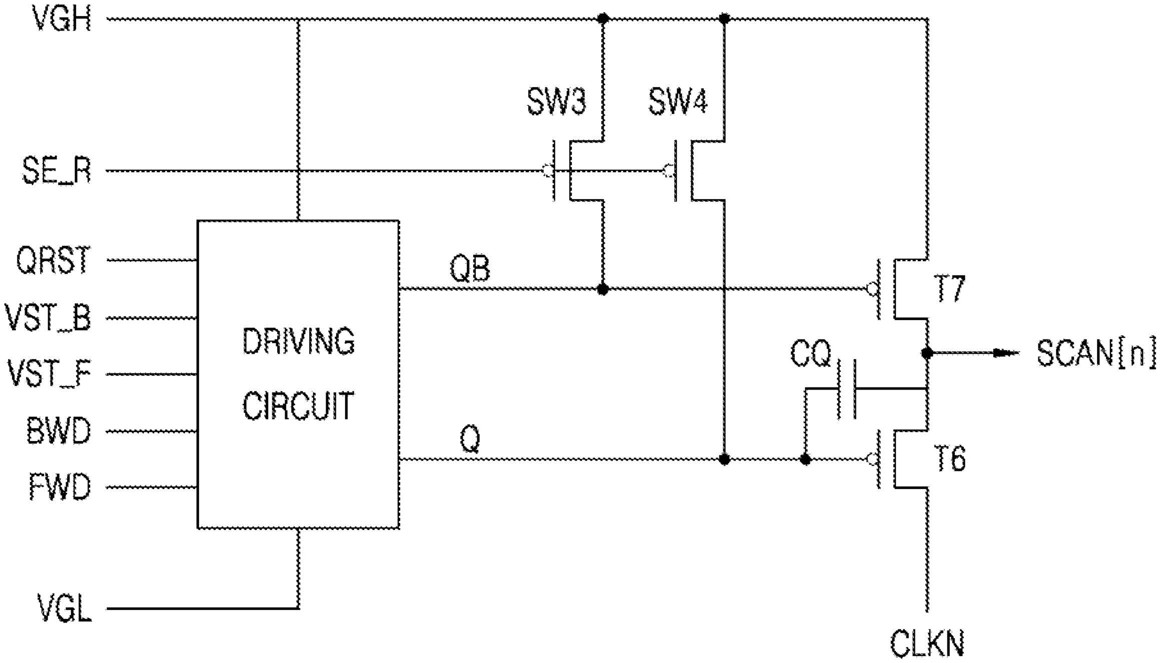
FIG. 15 shows a redundant gate driver according to one aspect of the present disclosure.

FIG. 15 shows a redundant gate driver according to one aspect of the present disclosure. The redundant gate driver may be the first redundant gate driver S1_R or the second redundant gate driver S2_R that generates the first scan signal or the second scan signal, respectively.

Referring to FIG. 15, the gate driver may include the driving circuit DRIVING CIRCUIT, the third switch SW3, the fourth switch SW4, the pull-up transistor T7, and the pull-down transistor T6.

The driving circuit may charge or discharge the QB node and Q node using at least one of the high-potential voltage VGH, the low-potential voltage VGL, the first voltage FWD, and the second voltage BWD in response to at least one of the global reset signal QRST, the reverse start signal VST_B, and the forward start signal VST_F.

The third switch SW3 and the fourth switch SW4 may be turned off based on the second selection signal SE_R or may transmit the high-potential voltage VGH to the QB node and the Q node to enable or disable the redundant gate driver.

The high-potential voltage VGH may be applied to the source electrode of the pull-up transistor T7. The output end may be connected to the drain electrode of the pull-up transistor T7, and the QB node may be connected to the gate electrode of the pull-up transistor T7. The pull-up transistor T7 may pull-up the output end in response to the signal of the QB node.

The clock signal CLKN may be applied to the drain electrode of the pull-down transistor T6. The output end may be connected to the source electrode of the pull-down transistor T6, and the Q node may be connected to the gate electrode of the pull-down transistor T6. The pull-down transistor T6 may pull-down the output end according to the clock signal CLKN in response to the signal of the Q node.

Aspects of the present disclosure may be set forth as follows:

A first aspect of the present disclosure provides a micro-LED display device comprising: a display panel including an array of a plurality of pixels, wherein in the display panel, a first switch line is disposed on one side of the array of the plurality of pixels, and a second switch line is disposed on the other side opposite to the one side of the array of the plurality of pixels, wherein each of the pixels includes: a micro-LED; a sub-pixel circuit configured to cause the micro-LED to emit light; and a GIA (Gate In Active) circuit configured to provide a scan signal to the sub-pixel circuit, wherein the GIA circuit includes at least one gate driver configured to be enabled or disabled based on a first selection signal transmitted from the first switch line.

According to some embodiments of the micro-LED display device, the GIA circuit further includes at least one redundant gate driver configured to be enabled or disabled based on a second selection signal transmitted from the second switch line.

According to some embodiments of the micro-LED display device, the display panel includes a first GIA area, a second GIA area, and a third GIA area, wherein the first switch line and the second switch line are disposed in each of the first GIA area, the second GIA area, and the third GIA area.

According to some embodiments of the micro-LED display device, the GIA circuit includes: a first gate driver configured to provide a first scan signal to the sub-pixel circuit; and a second gate driver configured to provide a second scan signal to the sub-pixel circuit.

According to some embodiments of the micro-LED display device, the first gate driver and the second gate driver are connected to the first switch line.

According to some embodiments of the micro-LED display device, the first gate driver and the second gate driver are configured to be disabled in response to the first selection signal transmitted via the first switch line.

According to some embodiments of the micro-LED display device, each of the first gate driver and the second gate driver includes: a pull-up transistor configured to pull up an output end in response to a signal of a QB node; a pull-down transistor configured to pull down the output end according to a clock signal in response to the signal of a Q node; a first switch configured to transmit a high-potential voltage to the QB node in response to the first selection signal to turn off the pull-up transistor; and a second switch configured to transmit the high-potential voltage to the Q node in response to the first selection signal to turn off the pull-down transistor.

According to some embodiments of the micro-LED display device, the GIA circuit further includes: a first redundant gate driver configured to provide the first scan signal to the sub-pixel circuit; and a second redundant gate driver configured to provide the second scan signal to the sub-pixel circuit.

According to some embodiments of the micro-LED display device, the first redundant gate driver and the second redundant gate driver are connected to the second switch line.

According to some embodiments of the micro-LED display device, each of the first redundant gate driver and the second redundant gate driver is configured to be disabled in response to the second selection signal transmitted via the second switch line.

According to some embodiments of the micro-LED display device, each of the first redundant gate driver and the second redundant gate driver includes: a pull-up transistor configured to pull up an output end in response to a signal of a QB node; a pull-down transistor configured to pull down the output end according to a clock signal in response to a signal of a Q node; a third switch configured to transmit a high-potential voltage to the QB node in response to the second selection signal to turn off the pull-up transistor; and a fourth switch configured to transmit the high-potential voltage to the Q node in response to the second selection signal to turn off the pull-down transistor.

According to some embodiments of the micro-LED display device, the second selection signal is a signal obtained by inverting the first selection signal, and the first selection signal is a signal obtained by inverting the second selection signal.

A second aspect of the present disclosure provides a gate driving circuit comprising: a GIA (Gate In Active) circuit configured to provide a scan signal to a sub-pixel circuit, wherein the GIA circuit includes: at least one gate driver connected to a first switch line and configured to be enabled or disabled based on a first selection signal transmitted from the first switch line; and at least one redundant gate driver connected to a second switch line and configured to be enabled or disabled based on a second selection signal transmitted from the second switch line.

According to some embodiments of the gate driving circuit, the first switch line is disposed on one side of an array of a plurality of pixels included in a display panel, and the second switch line is disposed the other side opposite to the one side of the array of the plurality of pixels.

According to some embodiments of the gate driving circuit, the second selection signal is a signal obtained by inverting the first selection signal, and the first selection signal is a signal obtained by inverting the second selection signal, wherein the redundant gate driver is enabled when the gate driver is disabled.

According to some embodiments of the gate driving circuit, the gate driver includes: a pull-up transistor configured to pull up an output end in response to a signal of a QB node; a pull-down transistor configured to pull down the output end according to a clock signal in response to the signal of a Q node; a first switch configured to transmit a high-potential voltage to the QB node in response to the first selection signal to turn off the pull-up transistor; and a second switch configured to transmit the high-potential voltage to the Q node in response to the first selection signal to turn off the pull-down transistor.

According to some embodiments of the gate driving circuit, during a forward operation, the gate driver is configured to discharge the Q node to a first voltage in response to a forward start signal, and, thus, to output the scan signal in response to the clock signal.

According to some embodiments of the gate driving circuit, during a reverse operation, the gate driver is configured to charge the Q node to a second voltage in response to a reverse start signal, and thus to output the scan signal in response to the clock signal.

According to some embodiments of the gate driving circuit, the redundant gate driver includes: a pull-up transistor configured to pull up an output end in response to a signal of a QB node; a pull-down transistor configured to pull down the output end according to a clock signal in response to a signal of a Q node; a third switch configured to transmit a high-potential voltage to the QB node in response to the second selection signal to turn off the pull-up transistor; and a fourth switch configured to transmit the high-potential voltage to the Q node in response to the second selection signal to turn off the pull-down transistor.

According to some embodiments of the gate driving circuit, during a forward operation, the redundant gate driver is configured to discharge the Q node to the first voltage in response to a forward start signal, and thus to output the scan signal in response to the clock signal, wherein during a reverse operation, the redundant gate driver is configured to charge the Q node to a second voltage in response to a reverse start signal, and thus to output the scan signal in response to the clock signal.

According to embodiments, the at least one gate driver within the GIA circuit may stably operate.

Furthermore, when a gate driver failure occurs in the GIA circuit, the gate driver failing to operate may be disabled, and the redundant gate driver corresponding thereto may be enabled, thereby improving reliability of the GIA circuit.

Furthermore, when the redundant gate driver operates, a certain voltage may be supplied to the Q node and the QB node of the gate driver failing to operate to disable the same. Thus, abnormal operation may be prevented.

Although the embodiments of the present disclosure have been described in more detail with reference to the accompanying drawings, the present disclosure is not necessarily limited to these embodiments, and may be modified in a various manner within the scope of the technical spirit of the present disclosure. Accordingly, the embodiments as disclosed in the present disclosure are intended to describe rather than limit the technical idea of the present disclosure, and the scope of the technical idea of the present disclosure is not limited by these embodiments. Therefore, it should be understood that the embodiments described above are not restrictive but illustrative in all respects.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A micro-LED display device comprising:

a display panel including an array of a plurality of pixels, a first switch line and a second switch line disposed in the display panel, wherein each of the plurality of pixels includes:

a micro-LED;

a sub-pixel circuit configured to cause the micro-LED to emit light; and a Gate In Active (GIA) circuit configured to provide a scan signal to the sub-pixel circuit, wherein the GIA circuit includes at least one gate driver configured to be enabled or disabled based on a first selection signal transmitted from the first switch line, wherein the GIA circuit further includes at least one redundant gate driver configured to be enabled or disabled based on a second selection signal transmitted from the second switch line, and wherein the redundant gate driver is enabled when the gate driver is disabled, wherein the at least one gate driver comprises:

a pull-up transistor configured to pull up an output end in response to a signal of a QB node;

a pull-down transistor configured to pull down the output end according to a clock signal in response to a signal of a Q node;

a first switch connected between the QB node and a high-potential voltage terminal and configured to transmit a high-potential voltage to the QB node in response to the first selection signal; and a second switch connected between the Q node and the high-potential voltage terminal and configured to transmit the high-potential voltage to the Q node in response to the first selection signal.

2. The micro-LED display device of claim 1, wherein the first switch line is disposed on a first side of the array of the plurality of pixels, and the second switch line is disposed on a second side opposite to the first side of the array of the plurality of pixels.

3. The micro-LED display device of claim 1, wherein the display panel includes a first GIA area, a second GIA area, and a third GIA area, wherein the first switch line and the second switch line are disposed in each of the first GIA area, the second GIA area, and the third GIA area.

4. The micro-LED display device of claim 1, wherein the GIA circuit comprises:

a first gate driver configured to provide a first scan signal to the sub-pixel circuit; and a second gate driver configured to provide a second scan signal to the sub-pixel circuit.

5. The micro-LED display device of claim 4, wherein the first gate driver and the second gate driver are connected to the first switch line.

6. The micro-LED display device of claim 5, wherein the first gate driver and the second gate driver are configured to be disabled in response to the first selection signal transmitted via the first switch line.

7. The micro-LED display device of claim 6, wherein each of the first gate driver and the second gate driver is configured to one of charge or discharge the QB node and the Q node using at least one of a high-potential voltage VGH, a low-potential voltage VGL, a first voltage FWD, and a second voltage BWD in response to at least one of a global reset signal QRST, a reverse start signal VST_B, and a forward start signal VST_F.

8. The micro-LED display device of claim 4, wherein the GIA circuit further comprises:

a first redundant gate driver configured to provide the first scan signal to the sub-pixel circuit; and a second redundant gate driver configured to provide the second scan signal to the sub-pixel circuit.

9. The micro-LED display device of claim 8, wherein the first redundant gate driver and the second redundant gate driver are connected to the second switch line.

10. The micro-LED display device of claim 9, wherein each of the first redundant gate driver and the second redundant gate driver is configured to be disabled in response to the second selection signal transmitted via the second switch line.

11. The micro-LED display device of claim 10, wherein each of the first redundant gate driver and the second redundant gate driver comprises:

a pull-up transistor configured to pull up an output end in response to a signal of a QB node;

a pull-down transistor configured to pull down the output end according to a clock signal in response to a signal of a Q node;

a third switch configured to transmit a high-potential voltage to the QB node in response to the second selection signal to turn off the pull-up transistor; and a fourth switch configured to transmit the high-potential voltage to the Q node in response to the second selection signal to turn off the pull-down transistor.

12. The micro-LED display device of claim 11, wherein each of the first redundant gate driver and the second redundant gate driver is configured to one of charge or discharge the QB node and the Q node using at least one of a high-potential voltage VGH, a low-potential voltage VGL, a first voltage FWD, and a second voltage BWD in response to at least one of a global reset signal QRST, thae reverse start signal VST_B, and a forward start signal VST_F.

13. The micro-LED display device of claim 11, wherein the second selection signal is a signal obtained by inverting the first selection signal, and the first selection signal is a signal obtained by inverting the second selection signal.

14. A gate driving circuit, comprising:

a Gate In Active (GIA) circuit configured to provide a scan signal to a sub-pixel circuit of a display panel, wherein the GIA circuit includes:

at least one gate driver connected to a first switch line disposed in the display panel and configured to be enabled or disabled based on a first selection signal transmitted from the first switch line; and at least one redundant gate driver connected to a second switch line disposed in the display panel and configured to be enabled or disabled based on a second selection signal transmitted from the second switch line, and wherein the redundant gate driver is enabled when the gate driver is disabled, wherein the at least one gate driver comprises:

a pull-up transistor configured to pull up an output end in response to a signal of a QB node;

a pull-down transistor configured to pull down the output end according to a clock signal in response to a signal of a Q node;

a first switch connected between the QB node and a high-potential voltage terminal and configured to transmit a high-potential voltage to the QB node in response to the first selection signal; and a second switch connected between the Q node and the high-potential voltage terminal and configured to transmit the high-potential voltage to the Q node in response to the first selection signal.

15. The gate driving circuit of claim 14, wherein the first switch line is disposed on one side of an array of a plurality of pixels included in the display panel, and the second switch line is disposed another side opposite to the one side of the array of the plurality of pixels.

16. The gate driving circuit of claim 14, wherein the second selection signal is a signal obtained by inverting the first selection signal, and the first selection signal is a signal obtained by inverting the second selection signal.

17. The gate driving circuit of claim 16, wherein each of the first gate driver and the second gate driver is configured to one of charge or discharge the QB node and the Q node using at least one of a high-potential voltage VGH, a low-potential voltage VGL, a first voltage FWD, and a second voltage BWD in response to at least one of a global reset signal QRST, a reverse start signal VST_B, and a forward start signal VST_F.

18. The gate driving circuit of claim 17, wherein during a forward operation, the gate driver is configured to:

discharge the Q node to the first voltage in response to the forward start signal, and output the scan signal in response to the clock signal.

19. The gate driving circuit of claim 18, wherein during a reverse operation, the gate driver is configured to:

charge the Q node to a second voltage in response to the reverse start signal, and output the scan signal in response to the clock signal.

20. The gate driving circuit of claim 14, wherein the redundant gate driver comprises:

a pull-up transistor configured to pull up an output end in response to a signal of a QB node;

a pull-down transistor configured to pull down the output end according to a clock signal in response to a signal of a Q node;

a third switch configured to transmit a high-potential voltage to the QB node in response to the second selection signal to turn off the pull-up transistor; and a fourth switch configured to transmit the high-potential voltage to the Q node in response to the second selection signal to turn off the pull-down transistor.

21. The micro-LED display device of claim 20, wherein each of the first redundant gate driver and the second redundant gate driver is configured to one of charge or discharge the QB node and the Q node using at least one of a high-potential voltage VGH, a low-potential voltage VGL, a first voltage FWD, and a second voltage BWD in response to at least one of a global reset signal QRST, a reverse start signal VST_B, and a forward start signal VST_F.

22. The gate driving circuit of claim 21, wherein during a forward operation, the redundant gate driver is configured to:

discharge the Q node to the first voltage in response to the forward start signal, and output the scan signal in response to the clock signal, and during a reverse operation, the redundant gate driver is configured to:

charge the Q node to a second voltage in response to the reverse start signal, and output the scan signal in response to the clock signal.

* * * * *